Patented Apr. 26, 1927.

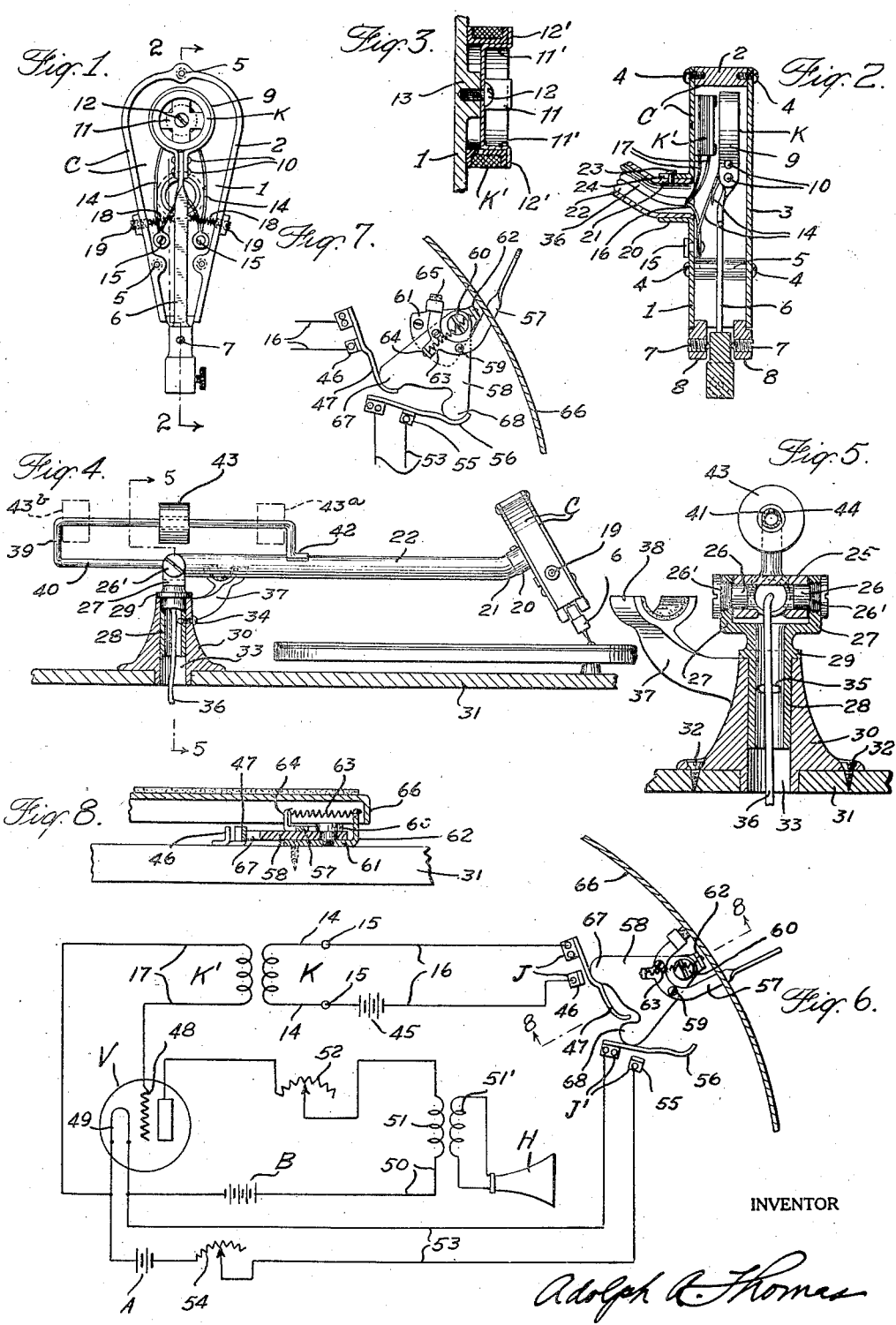

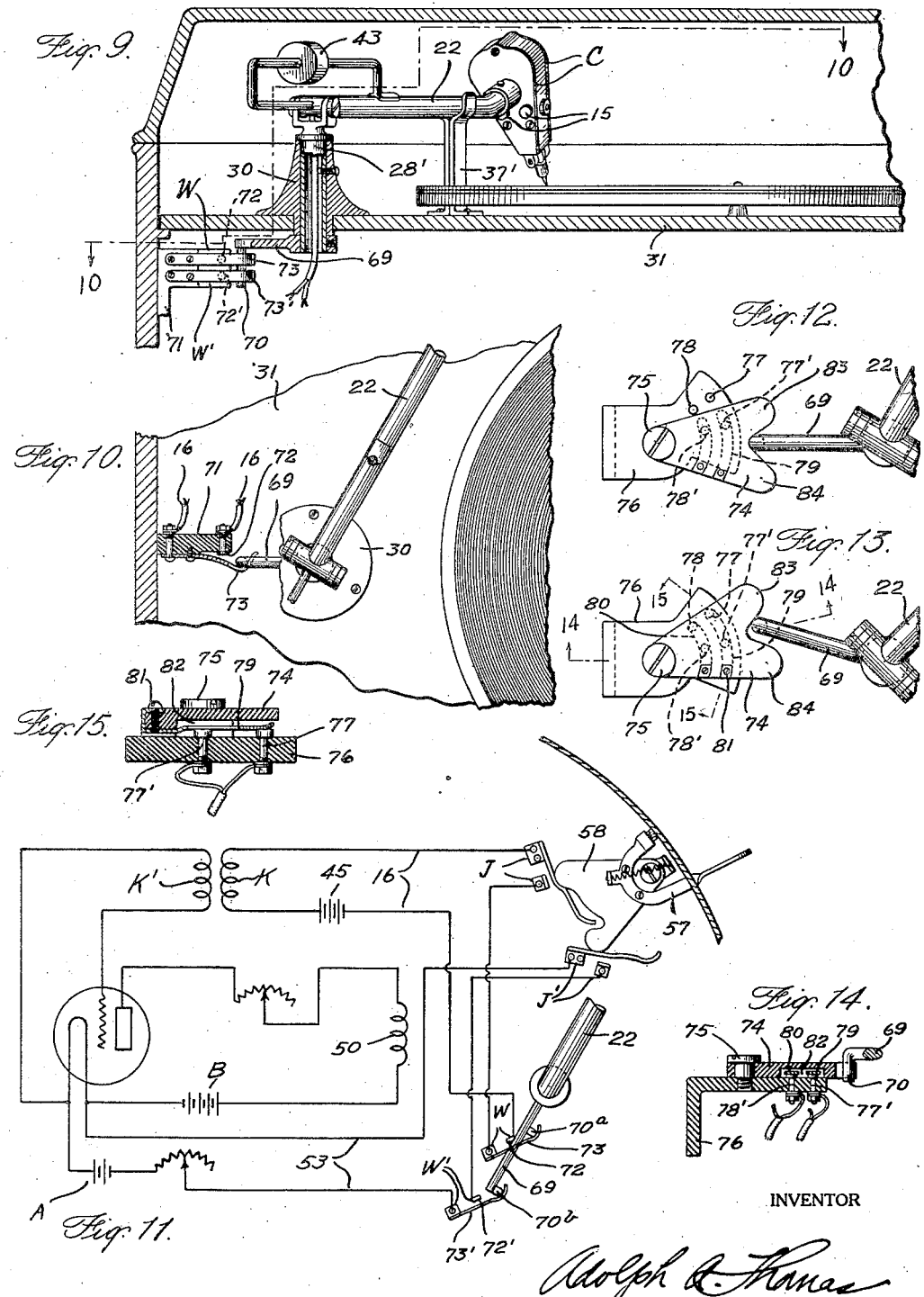

1,625,918

UNITED STATES PATENT OFFICE.

ADOLPH A. THOMAS, OF NEW YORK, N. Y.

ELECTRIC PHONOGRAPH.

Application filed February 10, 1926. Serial No. 87,306.

My invention relates to sound reproducing apparatus, and one of its objects is to provide a new and improved phonograph reproducer of the electric type, particularly adapted for reproducing from finely grooved records having several hundred threads to the inch. Such records cannot be effectively operated mechanically through the diaphragm of an ordinary sound box, for the needle vibrations are too delicate and the pressure of the needle point on the record is too slight to actuate a stiff diaphragm through the needle arm. Electric phonograph reproducers heretofore constructed have been designed to operate on coarsely grooved records having about 80 to 100 threads to the inch, and have thus been used as an electrical substitute for the well-known mechanical sound box.

According to my invention, I provide an electric reproducer so sensitive as to reproduce efficiently from a record having a microscopic groove, whether the same is cut vertically or laterally. The vibrations of the needle arm generate feeble current impulses which are amplified to operate a loudspeaker or other acoustic device. The construction is such that the pressure of the needle point on the delicate record groove is very slight and may be regulated to a nicety to obtain the best results in any particular case. Furthermore, the electric mechanism exerts no magnetic load or drag on the vibrations of the needle arm, which is always free to respond faithfully to the undulations of the record groove.

To obtain the foregoing and other advantages, I employ a pair of coils in inductive relation. One of these coils is fixed and the other coil is connected to (or otherwise operated by) the needle arm. By connecting the movable coil to the inner end of the neede arm, the vibrations of the needle point are transmitted to the coil in amplified ratio. Through one of the two coils flows a substantially constant current, and this coil therefore acts as a primary. The other coil, in which current impulses are induced, is connected in a suitable circuit and constitutes the secondary. It is immaterial which coil is the primary and which the secondary. As the movable coil vibrates in response to the needle vibrations, current impulses are induced in the secondary coil and these impulses are an electrical duplicate (as it were) of the record groove. Since these induced current impulses are necessarily very feeble, they require amplification. This may be obtained by means of one or more radio tubes properly connected in circuit, or by the use of any other amplifying instrumentalities.

On account of the unusual simplicity of my new reproducer, which has neither diaphragm nor magnet, it can be made exceedingly light, so that the pressure of the needle point on the record groove may only be a fraction of an ounce. I provide means for regulating the needle pressure if desired.

A further feature of my invention contemplates the automatic control of the reproducer circuit in accordance with the operative condition of the phonograph. When the machine stops playing, the current-consuming circuit or circuits in the reproducer connections are automatically interrupted. When the machine is again in playing condition, the interrupted circuits are automatically closed. This automatic control of the reproducer circuits may be obtained by the starting and stopping of the turntable, or by movement of the reproducer arm into and out of playing position, or by the combined action of the two operations mentioned. In the electric amplifying system of the reproducer, there is at least one circuit (and there may usually be two circuits) through which current flows even when the reproducer is not in actual operation. For instance, in using radio tubes for amplification, the filament batteries are constantly supplying current, irrespective of whether the reproducer is playing a record or is idle. Of course, a separate hand-operated switch for the filament battery can be provided, but a person playing an electric phonograph (especially a child) can hardly be depended upon to open the filament switch every time he is through playing a record. Even if a person should be careful enough to open all battery switches (or a single main switch) when he stops using the phonograph, the chances are that he would leave the switch closed while he is changing records, and he might spend considerable time in selecting a new record. That would mean a waste of current, which my automatic switch control positively prevents without any thought on the part of the operator. According to my invention, when the turntable stops, or when the reproducer arm is swung aside into idle position, all battery switches are automatically opened, and they stay open as long as the turntable is idle, or as long as the reproducer is not in playing position. When the machine is in condition to play the next record, the reproducer circuit or circuits are automatically closed. Thus, without heed on the part of the operator, the only time that battery current (or house-lighting current) is consumed in the amplifying system of the reproducer, is during the actual playing of records.

The foregoing and other features and advantages of my invention will be better understood from a detailed description of the accompanying drawings, in which I have presented several illustrative embodiments of my invention. In these drawings:

Fig. 1 shows an interior face view of an electric phonograph reproducer embodying my invention, with the front plate of the casing removed;

Fig. 2 represents a longitudinal section approximately on the irregular line 2—2 of Fig. 1;

Fig. 3 is a cross-section, on an enlarged scale, through the stationary coil in the reproducer casing to show how the coil may be secured to the back wall of the casing;

Fig. 4 illustrates the reproducer supported on a swivelled arm in playing position, and also showing an adjustable weight to regulate the pressure of the needle point on the phonograph record;

Fig. 5 is an enlarged sectional view on line 5—5 of Fig. 4;

Fig. 6 is a diagrammatic view showing how the battery circuits of an amplifying system for the reproducer are automatically held open as long as the turntable is braked;

Fig. 7 shows how the switches in Fig. 6 are automatically closed when the turntable is set in operation by releasing the brake;

Fig. 8 represents an enlarged fragmentary section on line 8—8 of Fig. 6 to show the mounting of the switch-controlling member;

Fig. 9 shows an inside view of a phonograph in which the reproducer arm automatically controls certain circuits by its movements into and out of playing position;

Fig. 10 is a plan view approximately on the broken line 10—10 of Fig. 9, showing how the switch contacts are held open by the reproducer arm when the same is in resting position;

Fig. 11 is a diagrammatic plan view illustrating how certain reproducer circuits are automatically controlled by the joint action of the turntable brake and the reproducer arm;

Fig. 12 shows a different form of switch controlled by the movements of the reproducer arm, the switch being open because the arm is supposed to be in idle position;

Fig. 13 is a view similar to Fig. 12, but showing how the switch is closed when the reproducer arm is in playing position;

Fig. 14 is a cross-section on line 14—14 of Fig. 13; and

Fig. 15 represents an enlarged cross-section on line 15—15 of Fig. 13.

Before proceeding with a detailed description of the figures, I want it understood that I have not attempted to show the various parts in correct working proportions relative to each other. Rather have I purposely spread out the parts in arrangement and dimensions, so as to make the drawings easy to read.

Referring first to the construction illustrated in Figs. 1–8, there is a casing C in which the reproducer elements are mounted for operation. This casing, which may be very small on account of the simple mechanism housed within, is preferably made of some light non-magnetic metal, such as aluminum or an aluminum alloy. In the present instance, the casing consists of a back plate 1, a body section 2, and a front plate or cover 3. The front and back plates are removably secured to the body section by screws 4 engaging in bosses 5 of the body section. Casing C may also be made of suitable composition material, like bakelite, in which event the parts 1 and 2 can be shaped or moulded as a single piece.

To the lower end of casing C is pivoted a needle arm 6 between a pair of adjustable bearings 7 carried in lugs 8, which may be formed integral with the central section of the casing. The needle arm is so mounted that it vibrates transversely of the casing—that is, from side to side as viewed in Fig. 1—for operating on lateral-cut records. Of course, for playing vertical-cut records, the mounting of the needle arm is changed correspondingly, or the casing itself may be so mounted on a supporting arm that the needle arm vibrates in a vertical plane. Any other suitable mounting for the needle arm 6 may be employed to play either style of record.

When I refer to the lever 6 as a needle arm, I use the term conveniently to include any practical member for holding a record-playing stylus. For lateral-cut records, the stylus is in the form of a pointed needle, usually of steel and sometimes of wood. For vertical-cut records, the stylus is generally a tiny piece of hard mineral, such as sapphire or a diamond point.

Within the casing are two small coils K and K'. Coil K is connected to the inner end of needle arm 6 in any practical way, as by means of a band or strap 9 which tightly holds the coil and has its ends attached to the needle arm by screws or rivets 10. Coil K′ is suitably supported in fixed position. A simple way of doing this is illustrated in Fig. 3, where the arms of a dish-formed bracket or spider 11 snugly engage the inner periphery of coil K′. A screw 12, engaging in a boss 13, holds bracket 11 to the rear wall of the casing. The circularly arranged shoulders 11′ on bracket 11 automatically centralize the coil, and the peripheral flanges or fingers 12′ hold the coil rigidly against the casing. Except for the thin flanges 12′, the supporting bracket 11 lies entirely within coil K′, so that the vibratory coil K may move in close proximity laterally past the fixed coil. The ends 14 of coil K are connected to a pair of binding posts 15 on the back of the casing. Circuit leads 16, to be described later in detail, are connected to binding posts 15. Conductors 17 connect coil K′ in a suitable amplifying circuit, as will presently be explained more fully. A pair of light coil springs 18, connected to opposite sides of the needle arm normally hold the same in such position that the coil K is substantially an axial alignment with the fixed coil K′. The outer ends of springs 18 are preferably connected to screws 19 mounted in the opposite sides of casing C. The screws 19 are adjustable from outside the casing to regulate the tension of each spring separately.

The operation of coils K and K′ is this: Let us assume that a constant current flows through coil K and that coil K′ is properly connected in a circuit adapted to operate on variable current impulses. As coil K vibrates past coil K′ under the action of the needle playing a record, current impulses are induced in coil K′ corresponding in frequency and amplitude to the vibrations of the needle arm. The electric impulses thus induced in the circuit of coil K′ are utilized to control one or more amplifying circuits for operating an acoustic device or any other suitable mechanism. Since coil K is at a considerably greater distance from pivot 7 of the needle arm than is the needle point as it tracks a record groove, it is obvious that the needle vibrations are transmitted to coil K in greatly amplified ratio. The smallest vibrations of the needle point impart sufficient movement to coil K to induce electric impulses in coil K′. While these impulses are necessarily feeble, they are easily amplified to give the desired reproduction.

The vibratory unit, consisting of needle arm 6 and coil K, can be made so light as to have no appreciable inertia. Furthermore, the electromagnetic interaction between the coils exerts no magnetic drag or load on the needle arm, at least in no interfering manner. Consequently, the needle arm always responds freely and correctly to the needle vibrations. Expressing this in a different way: no matter how light the pressure or how delicate the contact of the needle point in the record groove (within practical limits, of course), the freely movable needle arm with its coil offers no undue resistance to the action of the needle point. The springs 18 are so tensioned as to impose just the right load upon the needle arm in the playing of a record. That is something to be determined by experiment for each particular design of reproducer.

In the foregoing description of the operation of coils K and K′, it was assumed that K was the primary coil and K′ the secondary coil. It is immaterial which coil acts as the primary and which as the secondary coil. If desired, either or both coils may be provided with a soft-iron core to intensify the inductive effect on the secondary. Also, instead of mounting the vibratory coil to move laterally past the fixed coil, the movements of the vibratory coil may be toward and from the fixed coil or in any other direction to vary the magnetic flux through the secondary coil. Nor is it absolutely necessary that coil K be mounted directly on the needle arm 6, although that is the simplest way. It is possible, however, to support the coil independently of the needle arm for vibratory movement and connect the same operatively with the needle arm.

The reproducer casing C is provided with a hub 20, which may be formed integral with the back plate 1. The hub 20 is adapted to fit snugly over the upturned end 21 of a supporting arm 22. A set-screw 23, engaging in an axial slot 24 in hub 20, holds the casing in correct position on the arm 22. The upward tilt of the end 21 of this arm is so calculated that the needle arm has the proper slant in playing a record, as those skilled in the art will understand. The supporting arm 22 terminates at its rear end in a hollow trunnion 25 arranged to receive a pair of bearing pins 26, which are adjustably mounted in the arms 27 of a hollow swivel post 28. The bearing pins 26 are shown as cylindrical projections of screws 26′, which are easily inserted, adjusted or removed. The swivel post has an annular flange 29 arranged to rest on a fixed base 30, which is secured in proper position on the motor-board 31 of the phonograph, as by screws 32 or otherwise. The swivel post 28 fits snugly but rotatably into the vertical opening 33 of base member 30. It will be clear from the foregoing description that the reproducer arm 22 is pivoted for vertical movement about the pins 26 and is capable of horizontal movement about the swivel post 28. When I say that the reproducer is rigidly mounted on supporting arm 22, I do not mean that the mounting is non-adjustable, but simply that the reproducer and its supporting arm are movable vertically and laterally as a unit.

To prevent accidental lifting of post 28 out of its socket 33, I provide a set-screw 34 on the supporting stand 30 for engaging in a horizontal slot 35 in swivel post 28. The slot 35 is sufficiently long to permit horizontal movement of the reproducer arm 22 through the required range. Withdrawal of set-screw 34 permits ready removal of the entire reproducer mechanism form the supporting stand 30.

The arm 22 and swivel post 28 are preferably hollow so as to receive the conductors 36, indicated for convenience as a single cable, which connect the coils K and K' in their respective circuits. As seen from Fig. 5, the conductors pass through both pivotal connections without interfering with the vertical and horizontal movements of the reproducer arm. The concealment of these conductors adds to the neatness of the phonograph as a whole. Since the rod 22 does not act as a tone arm, it may consist of a small light tube no bigger than an ordinary lead pencil.

The supporting stand 30 carries a bracket 37, projecting at the proper angle and having its free end 38 shaped to receive the reproducer arm for supporting the same in idle or rest position to one side of the turntable. The bracket 37 may be cast integral with stand 30.

As previously stated, the casing C and all parts carried thereby may be made so light that the weight of the reproducer exerts very little pressure through the needle point on the record. There is, of course, the weight of the supporting arm 22 to be included, but that arm, too, can be formed of light material (like aluminum, for instance), so that the total pressure on the record at the needle point need not be more than a fraction of an ounce. This is important in playing records that have several hundred threads to the inch, where unduly heavy pressure at the vibratory needle point might rupture or otherwise injure the frail walls of the microscopic groove. Naturally, the precise degree of pressure at the needle point can only be determined by experiment, and the pressure most satisfactory for operation will obviously vary with different designs of reproducer, with different makes of records, and perhaps also depend on other factors familiar to the expert in this particular line.

In order to permit ready adjustment of the needle pressure on the record, I provide novel means for regulating this pressure to a point above and below the normal weight of the reproducer. By the normal weight of the reproducer I mean the combined weight of the supporting arm and the reproducer casing with all its parts. Referring to Fig. 4, it will be seen that the arm 22 carries a bracket 39, conveniently shaped from a piece of stiff wire and comprising a pair of parallel branches 40 and 41. The lower branch 40 is secured to the trunnion or cross-piece 25 of arm 22, and projects a certain distance to the rear of the pivotal mounting of the supporting arm. The upper branch 41 is secured at 42 to the arm 22. The rod 41 is preferably so arranged that it extends equal distances to the rear and to the front of trunnion 25. A suitable weight 43 is slidably mounted on rod 41 and fits snugly thereon so as to remain in adjusted position. For this purpose, the weight may have a frictional lining 44 which grips the rod and yet permits adjustment of the weight into any position on the rod. An easy way to obtain delicate adjustment of the weight is to turn it and at the same time push (or pull) it along the rod. This double movement produces a sort of screw adjustment of the weight, enabling the same to be easily placed into the exact position desired. The adjustment of the weight and its automatic securing in adjusted position are accomplished without the use of screw threads. When the weight 43 is directly over the pivot mounting of arm 22, as shown in full lines in Fig. 4, the effect of the weight is practically eliminated and the pressure at the needle point is the normal weight of the reproducer. Now, to increase this pressure, the weight 43 is shifted toward the reproducer, the maximum effect being obtained when the weight is in the extreme position indicated by dotted lines 43$^a$. In order to adjust the pressure at the needle point below the normal weight of the reproducer, the weight is moved to the rear of the pivot point of supporting arm 22. When the weight is in position 43$^b$, the pressure at the needle point is a minimum. Between the extreme limits of pressure represented by the positions 43$^a$ and 43$^b$ of the weight, it is possible to regulate the needle pressure so as to obtain the best results in any case. The one-piece bracket 39 is only one of several ways in which the adjustable weight 43 may be mounted on reproducer arm 22.

In Fig. 6 I have indicated diagrammatically a suitable amplifying system for coil K', in combination with novel means for controlling certain circuits of this system by the starting and stopping of the phonograph turntable. Coil K is connected in the circuit 16 of battery 45 or any other source of substantially constant current. The battery circuit has a suitable switch J, which is represented diagrammatically by a fixed contact 46 and a movable spring contact 47. The normal set of spring contact 47 tends to hold the switch open, as indicated in Fig. 6. The conductors 17 of coil K' are connected to the grid 48 and filament 49 of a vacuum tube V of usual construction. The plate circuit of this tube includes the battery B, an operating coil 51, and preferably also a rheostat 52. Coil 51 may operate or control any suitable acoustic device, such as a loudspeaker mounted in the phonograph cabinet or at a distance therefrom. In Fig. 6, I have conventionally indicated a phonograph horn H as part of a loudspeaker adapted to be operated through a coil 51' inductively related to coil 51. If additional stages of amplification are used, coil 51 is connected to, or controls, the grid circuit of the next tube, as will be understood without further explanation. The controlling arm of rheostat 52 may be mounted on the top-board of the machine for regulating the volume of reproduction. The filament circuit 53 includes the battery A, a rheostat 54 (if desired), and a suitable switch J', which is here indicated by means of a fixed contact 55 and a movable spring contact 56, which is normally held in open position by its inherent set.

Assuming the switches J and J' closed, the variable electric impulses induced in the circuit of coil K' produce amplified current variations in the plate coil 51, as will be understood by those familiar with this art.

In the absence of special provisions, it is clear that current will flow through the circuit of coil K and through filament circuit 53 as long as switches J and J' are closed, irrespective of whether the reproducer is playing or not. To prevent this waste of current, I employ means for automatically opening the switches J and J' when the machine is not in playing condition—as, for instance, when the turntable stops. In the example diagrammatically illustrated in Fig. 6, it has been assumed that the turntable is driven by a spring motor and is started and stopped by a finger brake. I have, therefore, shown a brake arm 57 secured to a cam sector 58, as by screws 59. The sector 58 is pivoted on a pin or screw 60 carried by a metal plate 61, which is screwed to the motor-board 31 of the phonograph, as best seen in Fig. 8. The plate 61 has an upstanding lug 62 to which is fastened one end of a coil spring 63. The other end of spring 63 is secured to a lug 64 on brake arm 57. A friction pad 65 on the inner end of the brake arm is adapted to engage the depending flange 66 of the turntable when the arm is moved into braking position, as shown in Fig. 6. The spring 63 is so connected that it presses the pad 65 firmly against the turntable to hold the same against turning. It goes without saying that the brake-arm 57 may be operated by hand to stop the turntable after the playing of a record, or it may be operated automatically at the end of a record by any of the well known contrivances heretofore used in commercial phonographs. Those so-called automatic stops are manually adjustable for each record, so that the brake-arm will not be moved into stopping position until after the record has been played through. My present invention has nothing to do with these automatic stops, and I mention them merely as one way of operating the brake 57.

The cam sector 58, which always moves with the brake arm 57, is of insulating material and has two cam projections 67 and 68 at its outer edge. These cam projections are so shaped and arranged relatively to the spring contacts 47 and 56 that, when the arm 57 is in braking position (as shown in Fig. 6), the switches J and J' are open and there is no current flow in battery circuits 16 and 53. When the brake arm 57 is thrown into releasing position to start the turntable, as indicated in Fig. 7, the cam projections 67 and 68 automatically move the switch contacts 47 and 56 into closing position. After a record has been played, the brake arm 57 is naturally snapped back into braking position to stop the turntable, and that automatically opens the switches J and J' without any attention on the part of the operator. In Fig. 6, the switch contact 47 is closed slightly ahead of contact 56. Closing the circuit of coil K in advance of the filament circuit eliminates the click that would be heard through the horn if the circuit of the primary coil were closed last.

In the preferred construction, the switches J and J' are mounted on the motor-board beneath the turntable, so that they are in concealed and protected position, and yet they are readily accessible by simply lifting off the turntable. No particular form of switch is necessary, providing only that it may be closed and opened upon the starting and stopping of the turntable.

While I have shown and described the switch-controlling member 58 as being operated by a turntable brake, it goes without saying that, in the broader aspect of my invention, the switches J and J' may be automatically controlled by any member which governs the starting and stopping of the turntable. For example, if the turntable is driven by an electric motor, the member 58 is operated by (or connected to) the switch that controls the motor circuit. For instance, the hand lever 57 can be used to open and close the motor circuit, as will be understood without additional illustrations or description. Also, I want to make it clear that the number of switches controlled by the starting and stopping of the turntable depends upon the reproducer connections and amplifying circuits employed in a given case. There may be one, two, three or more circuits through which current would continue to flow even when the reproducer was not playing. All such circuits should be automatically controlled to prevent waste of current when the phonograph is idle.

Instead of controlling the reproducer circuit or circuits by the starting and stopping of the turntable, as already described, I may control them by the movements of the reproducer arm into and out of playing position. An example of such a modification is shown in Figs. 9, 10 and 11, to which I shall now refer. Since Figs. 9–11 show the same reproducer and the same form and mounting of reproducer arm as Figs. 1–6, it will not be necessary to repeat in detail a description of the parts common to the two constructions. It is sufficient that the principal elements of Figs. 9–11 are indicated by the same reference characters as the corresponding elements in Figs. 1–6. In Fig. 9, the hollow swivel post 28' is longer than the swivel post 28 of Figs. 4–5, and extends below the motor-board 31. To this projection end of post 28' is attached a horizontal arm 69 carrying an insulating pin or lug 70. At a convenient place below the motor-board is fixed an insulating bracket 71 on which are mounted two switches, designated as a whole by W and W', respectively. The particular construction of the switches is immaterial. For convenience I have represented switch W by a fixed contact 72 and a movable spring contact 73. Similarly, switch W' is represented by a fixed contact 72' and a movable spring contact 73'. The normal set or tension of spring contacts 73 and 73' holds the switches closed. When the reproducer arm 22 is moved into idle or rest position, as when supported on a post or bracket 37' fixed on the motor-board to one side of the turntable, the pin 70 strikes the spring contacts 73 and 73' and simultaneously forces them away from the fixed contacts 72 and 72', thus opening both switches W and W'. When the arm 22 is swung forward into the playing position (i. e. turned clockwise as viewed in Fig. 10), pin 70 releases the contacts 73 and 73', which instantly move into closing position against their respective terminals 72 and 72'. The switches W and W' remain closed until the reproducer is moved back again into rest position.

The switches W and W' may be used either in lieu of the switches J and J' of Fig. 6, or in combination therewith, as diagrammatically indicated in Fig. 11. For the sake of clearness in this figure, switches W and W' are shown as if separately mounted, and the pin 70 on arm 69 is represented by two pins 70ª and 70ᵇ, one for each switch. It will be observed that switches J and W are arranged in series in the circuit 16 of coil K, and that switches J' and W' are connected in series in filament circuit 53. Consequently, the circuit of battery 45 is not closed unless both switches J and W are closed, and the opening of either switch breaks the circuit. For the same reason, the filament circuit is interrupted when either switch J' or W' is opened. Applying these conditions to the actual operation of the phonograph, it will be seen that when either the turntable stops or the reproducer arm is swung aside into idle position, the current-consuming circuit or circuits in the reproducer system are automatically opened to prevent waste of current. This double switch control is practically fool-proof. What I mean is this: When a person is through playing a record, he usually stops the turntable and pushes the reproducer arm into rest position. Now, if he stops the turntable without touching the reproducer, the switches J and J' are opened and the battery circuits 16 and 53 are broken. Should the operator, when a record is played through, merely swing the reproducer arm into rest position and let the turntable keep on going, the switches W and W' are opened and the battery circuits are interrupted, as before. When a person (even a small child) is through playing a record, he is sure to do one of two things, if not both—either he will stop the turntable or throw back the reproducer. Either action automatically opens the battery circuits, and they remain open until the phonograph is again in playing condition, whereupon they are automatically closed without any thought on the part of the operator. Although I have referred to circuits 16 and 53 as battery circuits, I do not mean that they must necessarily be supplied by current from batteries. Any other suitable source of current may be used. As far as I know, I am the first to provide means for automatically controlling one or more circuits in an electric phonograph reproducer in accordance with the operative condition of the machine, and I therefore claim this idea in a fundamental way.

There remains to be described the form of switch illustrated in Figs. 12–15. The pin 70 of arm 69 actuates an insulated sector 74 pivoted on a stud 75 carried by an insulating bracket 76. This bracket and all parts mounted thereon may be supposed to be substituted in Figs. 9 and 10 for bracket 71 and switches W—W'. Bracket 76 carries two pairs of switch contacts, 77—77' and 78—78', projecting above the top surface of the bracket. The contacts 77—77' constitute the terminals or binding posts of a switch in one circuit, and contacts 78—78' constitute the terminals of a switch in another circuit. For instance, contacts 77—77' may be connected in circuit 16, and contacts 78—78' in circuit 53. The pivoted sector 74 carries a pair of connecting fingers 79 and 80, which are preferably of spring metal, and secured at one end by a screw 81, as shown in Fig. 15. The figures 79 and 80 extend into a recess 82 in the underside of member 74, and are so curved as to be in alignment with the switch contacts 77—77′ and 78—78′. The controlling member 74 is formed with a pair of spaced cam projections 83 and 84 arranged to be engaged by the pin 70 of arm 69, which always moves with reproducer arm 22, as previously explained.

When the reproducer arm is swung into rest position, as shown in Fig. 12, sector 74 is automatically moved into such position that the fingers 79 and 80 are out of engagement with contacts 77 and 78, thus opening the switches represented by contacts 77—77′ and 78—78′. Now, when the reproducer arm is moved forward into playing position, the pin 70 swings member 74 into the position shown in Fig. 13, where the contacts 77—77′ and 78—78′ are spanned by the insulated conducting fingers 79 and 80, respectively, and the two switches are closed. In Fig. 13, the reproducer arm 22 is supposed to be about an inch or so from the turntable. Therefore, as the arm continues to swing forward, the sector 74 is moved back a little further, causing the fingers 79 and 80 to overlap slightly the rear contacts 77 and 78. During the playing of a record, the arm 69 is out of contact with member 74.

It should be noticed that the movable sector 74 is not spring-controlled, but remains in actuated position. The frictional engagement of the resilient fingers 79 and 80 on contacts 77—77′ and 78—78′ is sufficient to hold the member 74 in actuated position against accidental displacement. At the same time, the mounting of member 74 is such that it offers practically no resistance when kicked from one position to the other. The rubbing movement of fingers 79 and 80 over the fixed contacts tends to maintain all contact surfaces clean and provides ample contact areas, thus insuring positive closing of the switches with minimum resistance across the separable parts.

Attention is called to the fact that the automatic circuit-controlling means in my new phonograph operate independently of the character and size of the record surface and independently of the number of revolutions of the turntable in playing a record, so that ordinary commercial records of various sizes may be used. Nor is it necessary that the records lie on the turntable in any predetermined position; they are simply placed on the turntable in the usual way, as a child might do.

Although I have shown and described certain constructions, I want it clearly understood that I have done so for the purpose of explaining the principles and advantages of my invention to those skilled in the art, and not by way of restriction or limitation. Various changes and modifications may be resorted to in the practical application of my invention without departing from the scope of the appended claims. Also, it is evident that some features of the invention may be used without certain other features.

What I claim as my invention is:

1. An electric phonograph reproducer comprising a casing, a fixed coil mounted in said casing, a needle arm pivoted to said casing, a coil carried by the inner end of said needle arm to vibrate in inductive relation to said fixed coil, said coils being so arranged that their axes are substantially at right angles to the plane of vibration of said needle arm, and operative circuit connections for said coils.

2. An electric phonograph reproducer comprising a casing, a needle arm pivotally mounted on said casing, said pivot mounting being near the needle-holding end of said arm so that the inner end of this arm vibrates in amplified relation to the needle vibrations, a coil mounted in fixed position within said casing, a second coil fixed on the inner end of said needle arm to vibrate in inductive relation to said fixed coil, and circuit connections for said coils to utilize the current impulses generated by the movements of the second coil.

3. An electric phonograph reproducer comprising a shallow casing with front and rear walls, a fixed coil mounted on one of said walls with its axis substantially at right angles to the plane of said wall, a needle arm pivoted to said casing so as to vibrate transversely thereof between said walls, a coil carried by the inner end of said needle arm to vibrate in inductive relation to said fixed coil, said movable coil being arranged with its axis substantially parallel with the axis of said fixed coil, resilient means connected to said needle arm for normally holding the movable coil in predetermined relation to the fixed coil, and operative circuit connections for said coils.

4. In an electric phonograph reproducer, a casing provided with a pivoted needle arm, a pair of substantially cylindrical coils mounted in inductive relation to each other, one of said coils being fixed to the casing and the other coil being carried by the needle arm, and resilient means connected to said needle arm for normally holding the movable coil in substantially axial alignment with the fixed coil.

5. In an electric phonograph reproducer, an elongated casing, a needle arm pivoted to the lower end of said casing and extending into the same in the direction of the length of said casing, said needle arm being so mounted as to vibrate laterally of said casing, a pair of tensioned coil springs connected at one end to opposite sides of said casing, the other ends of said springs being connected to said needle arm, whereby said springs hold said arm resiliently in normal or centered position and exert tension on the arm against the lateral vibrations thereof, and electric reproducing means in said casing operated by said arm.

6. In an electric reproducer, the combination of a casing, a coil fixed flatwise on a wall of said casing, a needle arm pivoted to said casing so as to vibrate transversely thereof, and a coil mounted on said arm in close parallel relation to said fixed coil, whereby the vibrations of said arm move the attached coil transversely of the casing in inductive relation to the fixed coil.

7. In an electric phonograph reproducer, an arm pivoted at its rear end for vertical and horizontal movement, an electric reproducer mounted on the free end of said arm, and a slidable weight on said arm to regulate the pressure of the needle point on a record, said weight having a frictional lining snugly engaging said arm, whereby said weight is held in adjusted position.

8. In phonograph apparatus, an arm mounted at one end to swing horizontally over a record and also capable of vertical movement, a reproducer mounted on the free end of said arm, a horizontal bracket carried by said arm in spaced relation thereto, said bracket extending from the pivotal mounting of said arm toward the free end thereof, and a weight shiftable longitudinally on said bracket to regulate the pressure of the reproducer needle on the record.

9. In phonograph apparatus, an arm mounted at one end to swing horizontally over a record and also capable of vertical movement, a reproducer on the other end of said arm, the weight of said arm and reproducer constituting the normal pressure of the needle on a record, and means for regulating the effective pressure of the needle on a record above and below said normal pressure.

10. In phonograph apparatus, an arm mounted at one end to swing horizontally over a record and also capable of vertical movement, a reproducer mounted on the free end of said arm, and a weight carried by said arm and adjustable on either side of the pivot of said arm to regulate the pressure of the reproducer needle on a record.

11. In phonograph apparatus, an arm pivoted at one end to swing horizontally over a record and also capable of vertical movement, a reproducer mounted on the free end of said arm, a bracket carried by said arm and extending along the arm on both sides of the pivot, and a weight adjustable on said bracket to either side of the pivot of said arm for regulating the pressure of the reproducer needle on a record.

12. In an electric phonograph, an arm mounted to swing horizontally and vertically, an electric reproducer carried by said arm and having a circuit connected with a source of current, a stationary support for holding the reproducer arm in rest position, and means for automatically opening said circuit when the arm rests on said stationary support.

13. In an electric phonograph, an arm mounted to swing horizontally and vertically, an electric reproducer carried by said arm and having a circuit connected with a source of current, a stationary support for holding the reproducer arm in rest position, a normally closed switch for opening said circuit, and means for automatically opening said switch when the arm rests on said support, said switch being automatically closed when the arm is moved into playing position.

14. In a phonograph having a turntable, a horizontally swinging arm movable over said turntable, an electric reproducer carried by said arm, circuit connections for said reproducer, normally closed switch contacts for said circuit connections, means for so mounting said contacts that they remain closed during the travel of said arm over a record independently of the extent of movement of said arm toward the center of the record, and means movable with said arm for automatically opening said contacts when the arm is swung away from the center of the turntable into idle position.

15. In electric reproducing mechanism for phonographs, a hollow upright stand adapted to be supported on the motor board of a phonograph cabinet, and arm extending from said stand and mounted therein to swing horizontally and also in a vertical direction, an electric reproducer carried at the outer end of said arm, conductors leading from said reproducer into said hollow stand for connection in circuit, a stationary bracket for supporting said arm in rest position, and means moving with said arm to open the reproducer circuit when the arm rests on said bracket.

16. In an electric phonograph having a turntable, a horizontal supporting arm mounted to swing over the turntable, an electric reproducer carried by said arm and having a circuit connected with a source of current, and means for automatically controlling said circuit by the horizontal movement of the reproducer arm into and out of playing position, said controlling means being independent of the arc of travel of said arm over a record.

17. In an electric phonograph having a turntable, an electric reproducer having a circuit connected with the source of current, and provisions for automatically controlling said circuit conjointly by the movement of said reproducer into and out of playing position and by the starting and stopping of the turntable.

18. In an electric phonograph having a turntable for supporting records in playing position, means for obtaining electric impulses from the vibrations of a record needle, said means including a circuit through which current normally flows, and means whereby said circuit is closed only when the turntable rotates and the reproducer is in playing position, said means automatically breaking the circuit either when the turntable stops or when the reproducer arm is moved into rest position.

19. An electric phonograph having a reproducer for obtaining electric impulses from the vibrations of a record needle, a support on which said reproducer is mounted for movement into and out of playing position, means including a vacuum tube for amplifying said electric impulses, and mechanism automatically operated by the movement of said reproducer into and out of playing position for controlling the filament circuit of said tube.

20. In electric phonograph reproducing apparatus, the combination of a fixed coil, a needle arm, a coil operated by said needle arm and arranged to vibrate in inductive relation to said fixed coil, means for connecting one of said coils in a circuit of substantially constant potential, means for connecting the other coil in the grid circuit of a vacuum tube, an operative coil in the plate circuit of said tube, a switch in said first-mentioned circuit, a second switch in the filament circuit of said tube, and means for automatically closing both switches when the turntable starts and opening the switches when the turntable stops.

21. In an electric phonograph having a turntable and a brake for starting and stopping the turntable, electric reproducing apparatus comprising the combination of a fixed coil, a needle arm, a coil operated by said needle arm and arranged to vibrate in inductive relation to said fixed coil, means for connecting one of said coils in a circuit of substantially constant potential, means for connecting the other coil in the grid circuit of a vacuum tube, an operative coil in the plate circuit of said tube, a switch in said first-mentioned circuit, a second switch in the filament circuit of said tube, and means operated by said brake for automatically closing both switches when the brake is on and opening the switches when the brake is off.

22. In an electric phonograph having a motor-operated turntable and means for starting and stopping the same, a horizontally swinging arm adapted to be moved into and out of playing position, an electric reproducer carried by said arm, a circuit for said reproducer, a pair of switches connected in series in said circuit, means for operating one of said switches by the starting and stopping of the turntable, and means connected with said arm for operating the other switch by the movements of said arm into and out of playing position, whereby said circuit is closed only when the turntable is running and when the reproducer arm is in playing position.

23. In an electric phonograph, a supporting stand mounted on the top board of the cabinet, a swivel post mounted vertically on said stand for horizontal turning movement, a rigid arm pivoted at one end to said post for vertical movement, a casing rigidly mounted on the other end of said arm and carrying an electric reproducer, and a bracket projecting from said stand at the proper angle to support the reproducer arm in idle position.

24. In an electric phonograph, a supporting stand fixed on the top board of the cabinet, a swivel post mounted vertically on said stand for horizontal turning movement, a rigid arm pivoted at one end to said post for vertical movement, an electric reproducer rigidly mounted on the other end of said arm, and a bracket integral with said stand and projecting therefrom at the proper angle to support the reproducer arm in idle position.

25. In an electric phonograph, a horizontally swinging arm, an electrical reproducer attached to the free end of said arm, an extension connected with said arm so as to move therewith, and a switch in the reproducer circuit adapted to be closed and opened by said extension when the arm is moved respectively into and out of playing position, said switch being separate from said arm and extension.

26. In an electric phonograph, a horizontally swinging arm mounted on the top board of the phonograph, an electrical reproducer attached to the free end of said arm, a support for holding said arm in idle position, an extension arranged below the top board and connected with said arm so as to move therewith, and a switch in the reproducer circuit arranged below the top board independently of said extension and adapted to be operated by said extension when the arm is moved into and out of playing position, said switch being open when the arm rests on said support and being automatically closed when the arm is swung into playing position.

27. In an electric phonograph, a horizontally swinging arm, an electrical reproducer attached to the free end of said arm, an extension connected with said arm so as to move therewith, and a switch in the reproducer circuit adapted to be closed and opened by said extension when the arm is moved respectively into and out of playing position, said switch including a pivoted contact member supported independently of said extension and actuated thereby into closed and open positions, said member being inert and remaining in either actuated position.

28. In electric phonograph reproducing apparatus having a turntable for supporting records in playing position, a coil connected in the grid circuit of a vacuum tube, a second coil for producing electric impulses in said first coil in accordance with vibrations of a record-playing needle, a switch in the filament circuit of said tube, a second switch for controlling the circuit of said second coil, and means for automatically closing both switches when the turntable starts and opening the switches when the turntable stops.

29. In an electric phonograph having a turntable and a pivoted brake for starting and stopping the turntable, an electric reproducer for playing records, a battery circuit for said reproducer, switch mechanism for controlling said circuit, said mechanism including a movable contact, and a rotary member movable with said brake to actuate said switch contact into circuit-closing position when the brake is moved into starting position, said movable contact automatically opening the circuit when the brake is moved into stopping position.

ADOLPH A. THOMAS.